Figure 1:
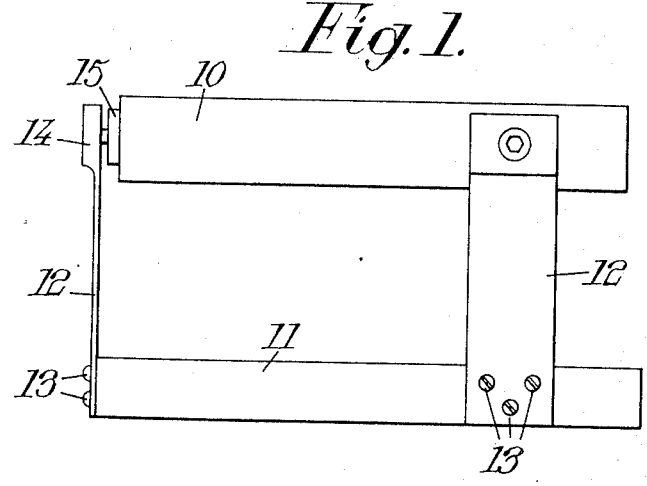

United States Patent [19]
Ciabrini

[11] 3,832,040
[45] Aug. 27, 1974

[54] FIXING DEVICE FOR A COMPONENT OF A SYSTEM

[75] Inventor: Jacques Paul Elie Ciabrini, Chatenay Malabry, France

[73] Assignee: Engins Matra, Paris, France

[22] Filed: Mar. 15, 1973

[21] Appl. No.: 341,328

[30] Foreign Application Priority Data
Apr. 14, 1972 France .............................. 72.1331

[52] U.S. Cl. ................. 350/310, 350/253, 350/245
[51] Int. Cl. ............................................. G02b 5/08
[58] Field of Search ........... 350/288, 245, 252, 253, 350/310

[56] References Cited
UNITED STATES PATENTS
3,015,990  1/1962  Jonkers .............................. 350/310
3,121,605  2/1964  Nuhn ................................. 350/310
3,334,959  8/1967  Walsh ................................ 350/310
3,620,606  11/1971  Tachunko ......................... 350/310

FOREIGN PATENTS OR APPLICATIONS
1,039,252  9/1958  Germany ........................... 350/310

*Primary Examiner*—Ronald L. Wibert
*Assistant Examiner*—Michael J. Tokar

[57] ABSTRACT

The device comprises a plurality of thin elastic strips distributed at equal angular intervals on a circle centered on the axis of the component. The large surface of the strips is positioned in the plane tangential to the circle parallel to the axis of the component, each of said strips having a tightly securing connection to the support (or the component) and a universal connection to the component (or the support). The device is particularly useful for fixing a component of an optical system in a satellite.

8 Claims, 2 Drawing Figures

FIXING DEVICE FOR A COMPONENT OF A SYSTEM

The invention relates to a device enabling the fixing of a component of a system to a support in a precise and stable position with respect to the support and without imposing therefore appreciable stresses on the said component when the device is not subject to forces of external origin. It relates more particularly to optical systems and this qualification should be interpreted as covering the whole field of waves whose properties of propagation are those of visible radiation.

The device is useful particularly, although not exclusively, for fixing a component of an optical system in a satellite. Among optical systems capable of being installed aboard a satellite, there are to be found especially telescopes whose mirrors must remain in an invariable position with respect to one another and with respect to a frame. The device ensuring the maintenance in position must not, during the use of the telescope, impose stresses on the mirrors which would be a source of aberration. This limitation of the stresses to a small magnitude is to a large extent conflicting with the necessity to give the fixing device mechanical characteristics which enable it to resist without breakage or deformation high accelerations and violent vibrations which occur on launching and of reducing the forces transmitted to the mirrors. There have already been made or proposed numerous devices for resolving the problem. None gives full satisfaction; either it subjects the mirror to high stresses in service, or it is of little reliability, or it is of too considerable a volume and weight.

It is an object of the invention to provide a device which responds better than those previously used or proposed to the exigencies of practice, especially in that it maintains in place the component in a precise position with respect to its support without subjecting it to notable mechanical stresses, even in the case of considerable variations in temperature, whilst being able to withstand satisfactorily forces of external origin, such as accelerations and vibrations, and remaining relatively low in weight.

With this object, the invention proposes in particular a device comprising a plurality of thin elastic strips distributed at equal angular intervals over a circle centered on the axis of the component, the large surface of each of the strips being placed in a plane tangential to that circle and being parallel to the axis of the component, each of said strips having tightly securing means to the support (or the component) and a universal connection with the component (or the support).

The securing means can be formed by clamping the terminal portion of the strip against a surface parallel to the axis of the support or of the component, as the case may be, by means of screws or of any other suitable fixing members.

The device lends itself particularly well to the fixing of a telescope mirror having a substantially cylindrical lateral wall to a support. The ball-joint connection will then generally be constituted by a portion rigidly fixed to the mirror, borne by a pin bonded to a flat of the cylindrical surface or tightly secured to said surface and by a complementary portion borne by the non-secured terminal portion of the corresponding strip.

Each strip can be of rectangular shape. But it can also have a flared shape of the end comprising a ball and socket type connection towards the end having a securing connection, in order that the flexing stresses created by the forces acting transversely to the axis of the mirror they have the same order of magnitude all along the strip. In any case, the strip is advantageously given a constant thickness over the whole of its active portion, intended to work in flexion.

Figure 2:
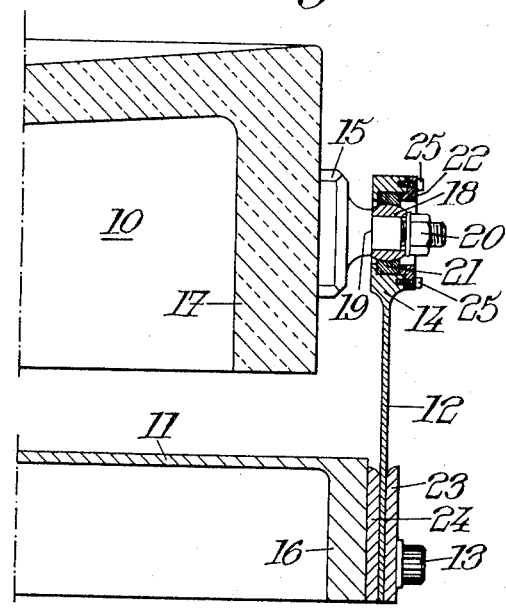

The invention will be better understood on reading the description which follows of a device constituting a particular embodiment of the invention, given by way of non-limiting example. The description refers to the drawing which accompanies it and in which:

FIG. 1 is a diagram of the principle showing the device, intended to hold a mirror with respect to a fixed support in a meteorological satellite; and FIG. 2 is a detailed view on a large scale, in section along a plane passing through the axis of the mirror of FIG. 1 and through the middle plane of one of the suspending strips.

FIG. 1 shows diagrammatically a concave mirror 10, constituting the primary mirror of a telescope of which the other members are not shown. This mirror must be, in the course of operation of the telescope, that is to say once it is in orbit, maintained in a position invariable with respect to a support 11, which can be a structural element of the satellite. The mirror 10 has a cylindrical lateral surface of diameter slightly less than that of the external surface, also cylindrical, of the support 11. The fixing device comprises three strips 12, of which two only are visible in FIG. 1, distributed at equal angular intervals around the mirror 10 and connecting the latter to the support 11. One of the terminal portions of each strip (the lower portion in FIG. 1) is fixed flat by three screws 13 to the support 11 to constitute a connection similar to tight clamping from the mechanical point of view. The strip 12 having to be flat, there has in practice to be formed a flat of sufficient width on the support 11 to constitute a support surface. This flat can also be constituted by the bottom of a notch, this solution enabling the fixing device to be given a radial size which does not exceed that of the support.

The strip 12 has beyond the securing zone a free portion of the same thickness as the tightly secured portion, then a thickened terminal portion 14, whose thickness is greater than that of the portion intended to work in flexion. This terminal portion 14 is connected to the mirror 10 by a universal joint enabling angular deflection in all directions. The universal joint can be a ball-joint comprising a ball (not seen in FIG. 1) fast to a pin 15 fixed to the mirror and a ring (not seen in FIG. 1) fast to the thickened portion 14 of the strip 12. The difference in diameter between the mirror 10 and the support 11 is advantageously selected as a function of the radial size of the ball-joint connection so that the strips 12 are not under stress on mounting and so that no radial force of traction or of compression is applied to the mirror when the latter is not subject to external forces, nor dilated or contracted. Instead of a ball-joint connection, other universal joints could be used having a sufficient deflection, such as journals or trunions.

In the embodiment illustrated in FIG. 1, three strips are provided. This arrangement corresponds to isostatic mounting of the mirror, particularly favourable from the mechanical point of view. But the number of strips could be increased with or without preserving equal separations between successive strips.

FIG. 2 shows in detail the constitution of one of the strips 12 and the connections between the strip and, on one hand, the mirror 10, on the other hand the support 11. The support, of which a fraction is shown in FIG. 2, is constituted by a plate provided with a cylindrical rim 16 comprising three support flats, of width at least equal to that of the strips 12, all of which are identical. The mirror 10, of which a fraction only is shown, is of glass with a very low coefficient of thermal expansion, but could just as well be of another material such as aluminium or beryllium. It also comprises a cylindrical rim 17 provided with flats each intended to receive a pin 15 on which the ball 18 is fixed. The pin is advantageously made fast to the mirror by gluing with Araldite on the flat, but it is also possible to embed in the glass a bolt for fixing the pin. In addition, the lateral surface of the mirror can remain cylindrical, the support surface of the pin 15 then having to be of corresponding shape. In the embodiment illustrated in FIG. 2, the ball 18 is pierced by a hole, threaded on to a cylindrical extension of the pin and flattened against a shoulder 19 of this pin by a nut 20 screwed on a terminal threading of the extension. It is generally advantageous to place the pin 15 so that the axis of the ball-joint coincides fairly well with a radius of the mirror constituting a neutral line in the case of thermal deformation, at least when this "neutral line" i.e., the line which does change in length on deformation, is not too distant from the center of gravity of the mirror.

The portion of the ball-joint fast to the strip 12 comprises a ring 21, slid into a housing formed in the thickened terminal portion 14 of the strip and held by a washer 22. This washer is for example fixed to the thickened portion 14 by four screws 25 (of which two are visible in FIG. 2). It suffices for the ball-joint to permit an angular deflection corresponding to the maximum displacements contemplated for the mirror.

The tight securing of the strip 12 is ensured by screws 13, of which one only is visible in FIG. 2. These screws are supported on the strip by means of a flat plate 23 for distributing the forces. Between the strip 12 and the flat of the support 11 is inserted a second plate 24 constituting a shim. The thickness of the plates 24 is selected on mounting to place the mirror 10 in the required position with respect to the support, without however placing the strips 12 in flexion. There could obviously be used other fixing means than screws, for example rivets or gluing.

By way of example, it may be indicated that an arrangement of the type illustrated in FIG. 2 has been adopted for carrying a mirror of about 400 mm diameter, weighing 4,600 kg. The portion working in flexion (between the thickened portion and the plates 23 and 24) of the three strips, of spring steel, had a thickness of 1 mm and a length and width of 30 mm. The support was constituted by a ring or annulus of light alloy. This device was shown in trials to be capable of filtering, in very efficient manner, vibrations of higher frequency than 300 Hz in a direction contained in the plane of the component and higher than 500 Hz along the axis of the component, and hence of reducing very substantially the accelerations which tend to bring the mirror to its own resonance frequency of 1,200 Hz.

To further lighten the device, in particular when the mass suspended is large, there may be given to the strips a trapezoidal shape widening from the thickened portion towards the secured terminal portion. Moreover, the support can often be constituted by a structural element of the carrying vehicle.

The invention is in no way limited, of course, to the particular embodiment which has been described by way of example and it must be understood that the scope of the present patent extends to modifications of all or some of the features described remaining within the scope of mechanical equivalents, as well as to any application, and that several devices can be used to fix to the same support several components of this system.

I claim:
1. Device for fixing a component of a system with respect to a support, said component having an axis, comprising a plurality of thin elastic strips distributed at equal angular intervals on a reference circle centered on said axis of the component, the larger surface of each strip being positioned in a plane tangent to said circle and being parallel to said axis of the component, a first portion of each of said strips having securing means for tightly securing said first portion to the support or to the component and a second portion of each said strip spaced apart from said first portion having universal means for connection to the component or the support respectively.

2. Device according to claim 1, wherein said first and second strip portions are terminal portions and said securing means comprises means for clamping said first strip portion against a surface of the support or of the component which is parallel to said axis.

3. Device according to claim 2, wherein said clamping means comprise screws or the like.

4. Device according to claim 1, wherein the universal means is of the ball and socket type.

5. Device according to claim 1, wherein said larger surface of each strip is rectangular.

6. Device according to claim 1, wherein said larger surface of each strip has a flared shape from the end comprising a ball and socket type means towards the end having a tightly securing means.

7. Device according to claim 1, wherein each strip has a constant thickness, except in its terminal portion having a ball and socket type means and which is thickened.

8. Device for resiliently securing an optical component having an axis to a support, comprising at least three thin resilient elongated strips resiliently flexible in a first direction and substantially stiff in a second direction perpendicular to the first direction, said strips being evenly distributed about said axis and all located at the same distance of said axis with said first direction directed radially to said axis, means tightly securing an end portion of each said strip to one of said support and said component,
and universal joint means pivotally connecting a portion of each said strip remote from said end portion to the other of said component and said support.

* * * * *